United States Patent
Tikhonenko et al.

(10) Patent No.: US 8,286,761 B2
(45) Date of Patent: Oct. 16, 2012

(54) SHOCK ABSORBER FOR A TRANSPORTATION MEANS

(75) Inventors: Oleg Olegovich Tikhonenko, Moscow (RU); Vladimir Pavlovich Lobko, Yubileiniy (RU)

(73) Assignee: Troy Capital Group Corp., Las Vegas, NV (US)

( * ) Notice: Subject to any disclaimer, the term of this patent is extended or adjusted under 35 U.S.C. 154(b) by 0 days.

(21) Appl. No.: 13/385,200

(22) Filed: Feb. 7, 2012

(65) Prior Publication Data
US 2012/0138400 A1    Jun. 7, 2012

Related U.S. Application Data

(62) Division of application No. 12/806,597, filed on Aug. 17, 2010, now Pat. No. 8,146,720.

(51) Int. Cl.
*F16F 9/30*  (2006.01)

(52) U.S. Cl. ........................................ 188/129; 267/119

(58) Field of Classification Search ................... 188/288, 188/289, 322.17, 322.18, 129; 267/64.15–64.28, 267/118, 119, 130
See application file for complete search history.

(56) References Cited

U.S. PATENT DOCUMENTS

| 5,257,680 | A | * | 11/1993 | Corcoran et al. | 188/129 |
|---|---|---|---|---|---|
| 6,170,809 | B1 | * | 1/2001 | Cotter | 267/119 |
| 6,322,059 | B1 | * | 11/2001 | Kelm et al. | 267/119 |
| 8,146,720 | B2 | * | 4/2012 | Tikhonenko et al. | 188/268 |
| 2002/0130453 | A1 | * | 9/2002 | Roper | 267/130 |
| 2009/0072453 | A1 | * | 3/2009 | Cotter et al. | 267/64.13 |

* cited by examiner

*Primary Examiner* — Christopher Schwartz
(74) *Attorney, Agent, or Firm* — Aleksandr Smushkovich

(57) ABSTRACT

A shock absorber includes a sleeve, a piston accomplishing forward and reverse travels therein, a rod, a piston cap, a rod cap including an orifice and a rod seal mounted therein. The rod seal defines a front face facing the piston and a rear face being opposite to the front face. The rod includes at least two rod regions including annular humps. The front and rear faces operatively interact with the annular humps during the forward and reverse travels, such that the interaction causes deformations of the rod seal thereby cushioning impacts and reducing overloads of the shock absorber. An embodiment of the shock absorber further includes two annular humps represented by a first annular hump, having a first maximal diameter, and a second annular hump, having a second maximal diameter, while the first maximal diameter is greater than the second maximal diameter, preferably by 3-10 micrometers.

4 Claims, 26 Drawing Sheets

SHOCK ABSORBER FOR A TRANSPORTATION MEANS

CROSS-REFERENCES TO RELATED APPLICATIONS

This U.S. patent application is a divisional application of a U.S. patent application Ser. No. 12/806,597, filed on Aug. 17, 2010, titled "Shock Absorber for a Transportation Means", now being U.S. Pat. No. 8,146,720, hereby incorporated by reference in its entirety. This divisional application claims the benefit of application Ser. No. 12/806,597 under 35 U.S.C. 120.

FIELD OF THE INVENTION

The invention relates to the machine construction field, more specifically to the field of designing dampers (shock absorbers) or struts mostly for transportation means. It might be particularly utilized for manufacturing hydraulic, pneumo-hydraulic, and pneumatic shock absorbers applicable, for example, for support of frame elements of a transportation means.

BACKGROUND OF THE INVENTION

Although there are known a great variety of dampers or shock absorbers, a majority thereof typically comprise common elements: a sleeve (cylinder) having a longitudinal axis and filled with suitable oil, a damper piston (herein further called 'piston'), and a piston rod (herein further called 'rod') fixedly coupled with the piston. The rod and piston are capable of accomplishing a reciprocating movement within the sleeve along the longitudinal axis thereof. Besides the aforementioned elements, a shock absorber can include a housing, typically enclosing the sleeve, and additional external cylinders. The piston partitions the sleeve into two chambers of variable volumes. As a rule, the piston includes a plurality of precisely calibrated orifices for oil cross-flow from one chamber to the other (e.g. see Russian Useful Model 74602). Some dampers may comprise a cavity between the housing and the sleeve, while the sleeve may include orifices for oil cross-flow from a chamber of the sleeve into the cavity.

At present, one-tube gas-oil shock absorbers with a high-pressure gas chamber and two-tubes oil shock absorbers with low-pressure gas support are among widest-spread damper devices. In the related art there is known a shock absorber including an elastic element (spring), a cylinder, a piston, and a rod (U.S. Pat. No. 3,857,307 issued 31 Dec. 1974). It can be applied for improving a damper system of transportation means, wherein the load exerted onto the suspension unit varies within a broad range, which may cause maximal values of the amplitude of piston's oscillations relatively to the middle point on the longitudinal axis of the shock absorber. A drawback of such device is an insufficient increase of force counteracting the movement of piston in the cylinder within the region(s) proximate to the absorber's cap(s). The most similar device found in the related art (further called 'prototype') is considered a damper, designed according to Russian Useful Model 74602 that comprises a sleeve, a piston, a piston cap, a rod, a rod cap, wherein the rod and piston are capable of collective displacing within the sleeve along the longitudinal direction of sleeve. The aforementioned prototype shares certain common features with the present invention, but is in fact essentially different in its design principles. The prototype has the following shortcomings:

an insufficient increase of a force counteracting the movement of the piston in the sleeve in the regions proximate to the caps;

underuse of two sealing lateral surfaces during the forward and the reverse travels of the piston, where the piston is located in the sleeve within a vicinity proximate to the piston cap; and underuse of two sealing lateral surfaces during the forward and the reverse travels of the piston, where the piston is located in the sleeve within a vicinity proximate to the rod cap.

BRIEF SUMMARY OF THE INVENTION

The primary aim of the invention is the improvement of damping oscillations, typically arising in a transportation means in the course of movement, due to more intensive absorption of energy of the oscillations. Another aim of the invention is to provide additional features that allow significant suppressing or avoiding auto-oscillation and resonance regimes of operation of the shock absorbers. Other aims and particular applications of the claimed invention may become apparent to one skilled in the art upon learning the present disclosure.

The aforementioned aims have been achieved by providing an inventive shock absorber for a transportation means comprising: a sleeve with an operation area; a piston cap, a rod, a rod cap with a rod seal for sealing the rod, a piston with a piston seal; the operation area of the sleeve includes a sleeve area jointed to the piston cap and a sleeve area jointed to the rod cap; the rod includes a rod area jointed to an end free of the piston and a piston area of the rod, wherein the piston is made with a capability of longitudinal movement along the operation area of the sleeve, and the rod with the piston are made with a capability of join longitudinal movement in the sleeve; said shock absorber is different in that: the rod is made such that in the area jointed to the end being free of the piston, the rod surface along a length of the rod includes two regions, and on each of the regions along a direction from the piston to the end being free of the piston, an inner diameter of the rod along the length of the rod's region increases to a value of a maximal outer diameter on this section, and then decreases to a value of a minimal outer diameter on this region; and, on the region most proximate to the end being free from the piston, the maximal outer diameter of the rod is greater than the maximal outer diameter of the region most remote from the end being free of the piston; and, in the piston area of the rod, the rod surface, along the length of the area, includes two regions, each of the region in a direction from the piston to the rod's end being free of the piston, an inner diameter of the rod, along the length of the region, increases to a value of a maximal outer diameter of the rod, and then decreases to a value of a minimal outer diameter of the rod on this region; and, on the region, most proximate to the piston, the maximal outer diameter of the rod is greater than the maximal outer diameter of the rod on the region most remote from the piston.

The aforementioned aims have also been achieved by providing an inventive shock absorber for a transportation means comprising: a sleeve; a piston operatively accomplishing reciprocal movements consisting of forward and reverse travels within said sleeve; a rod having a first end rigidly coupled with the piston and a second end extending beyond said sleeve, said rod has a longitudinal axis; a piston cap closing said sleeve from the piston's side; a rod cap closing said sleeve from the rod's side; wherein: said rod cap includes an orifice situated substantially in the center of said rod cap and a rod seal mounted in said orifice; said rod seal defines a front face facing the piston and a rear face being opposite to the front face; said rod is capable of slidely and sealingly moving through said rod seal along the longitudinal axis; said rod includes at least two rod regions including annular humps; and said front and rear faces operatively interact with said annular humps during the forward and reverse travels, such that the interaction causes deformations of said rod seal thereby cushioning impacts and reducing overloads of the shock absorber.

In a more specific embodiment, the aforementioned inventive shock absorber is characterized in that said at least two annular humps are represented by:—a first annular hump having a first maximal diameter, and—a second annular hump having a second maximal diameter; wherein said first maximal diameter is greater than said second maximal diameter.

In a more specific embodiment, the aforementioned inventive shock absorber is characterized in that the difference between said first maximal diameter and said second maximal diameter ranges from 3 to 10 micrometers.

Generally, the piston and rod move within the sleeve overcoming resistance of oil/gas cross-flows from one sleeve's chamber to the other, and friction between the rod and the rod seal. The proposed shock absorber allows increasing the resistance offered to the movement of piston thereby improving the efficiency of damping. This is achieved by providing the aforementioned annular humps arranged on the rod. Different embodiments combine features conditioned by various diameter differences for the humps, etc. Several embodiments are aimed to introduce asymmetry in the design of shock absorber and thereby insure suppressing/avoiding auto-oscillation and resonance regimes.

BRIEF DESCRIPTION OF DRAWINGS OF THE INVENTION

DETAIL DESCRIPTION OF PREFERRED EMBODIMENTS OF THE INVENTION

While the invention may be susceptible to embodiment in different forms, there are described in detail herein below, specific embodiments of the present invention, with the understanding that the present disclosure is to be considered an exemplification of the principles of the invention, and is not intended to limit the invention to that as illustrated and described herein.

Figure 1:
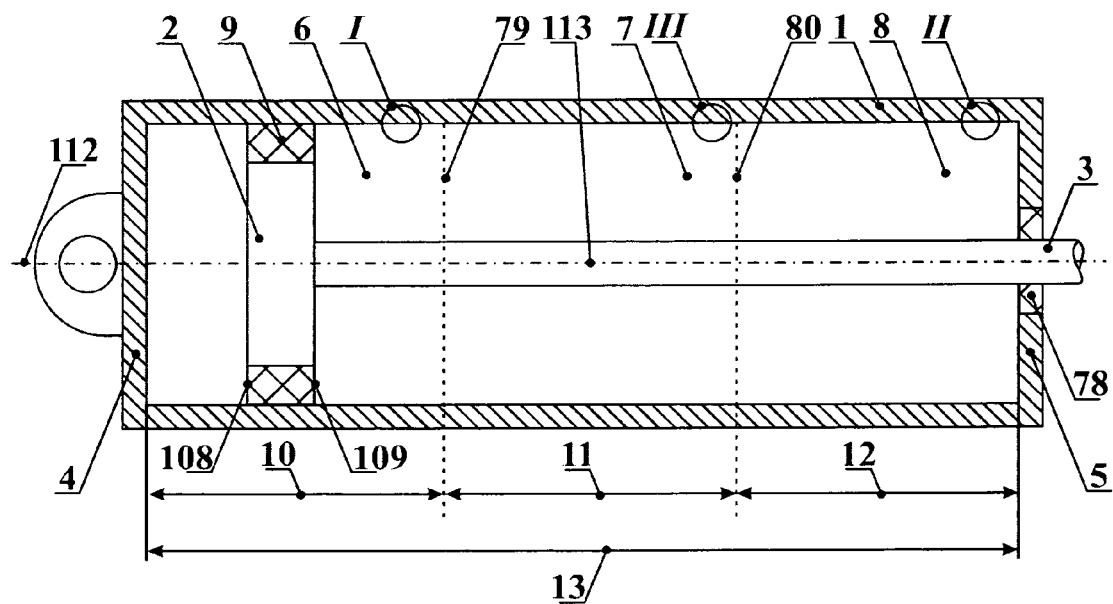
FIG. 1 shows a longitudinal cross-sectional view of the inventive shock absorber, including: a sleeve with a rod seal, a rod, a piston, a rod cap, a piston cap, according to an embodiment of the present invention: the sleeve is shown with corresponding cross-sections I, II and III of the inner surface thereof.

According to a preferred embodiment shown on FIG. 1, the inventive shock absorber comprises: a sleeve 1 having a longitudinal axis 112; the sleeve 1 encloses a cylindrical piston 2, a rod 3 fixedly coupled with the piston 2; the rod 3 has a longitudinal axis 113 that coincides with the axis 112; the rod 3 with the piston 2 are capable of accomplishing a reciprocating movement within the sleeve 1 along the longitudinal axis 112. The piston 2 is furnished with a piston seal 9 circumferentially attached to the lateral cylindrical surface of piston. The piston seal 9 defines a face 108 and a face 109. Therefore, the piston 2 sealingly divides the interior of sleeve 1 into two chambers, whose volumes vary depending on the location of the piston 2.

The sleeve 1 has an operative surface 13 defined as an internal surface of the sleeve capable of interaction with the faces 108 and 109 during operation of the shock absorber, as described in U.S. patent application Ser. No. 12/806,597. The surface 13 is divided into a left region 6, a middle region 7, and a right region 8, characterized by corresponding lengths: 10, 11, and 12. The boundaries of the regions 6, 7, and 8 are shown by vertical dashed lines 79 and 80. The sleeve 1 is closed by a piston cap 4 on the left end, and is closed by a rod cap 3 on the right end of the sleeve, as depicted on FIG. 1.

As illustrated on FIG. 1, the rod cap 5 is a disc-shaped lid of the shock absorber that is rigidly coupled with the sleeve 1 on the right end thereof; the rod cap 5 has an orifice situated substantially in the center of the rod cap, a rod seal 78 is mounted in the orifice, such that the rod 3 is capable of slidely and sealingly moving therethrough. The rod seal 78 is sometimes called a seal guide for the rod.

As illustrated on FIG. 1, the piston cap 4 and rod cap 5 are a solid disc-shaped lids of the shock absorber that are coupled with the sleeve 1 on the left end and the right end thereof respectively.

The rod seal 78 has an essentially cylindrical inner operative surface. The rod 3 has an operative surface that snug-fits into and interacts with the cylindrical inner operative surface of rod seal 78 during the movements of the piston 2 with the rod 3, i.e. during the operation of the shock absorber.

Figure 2:
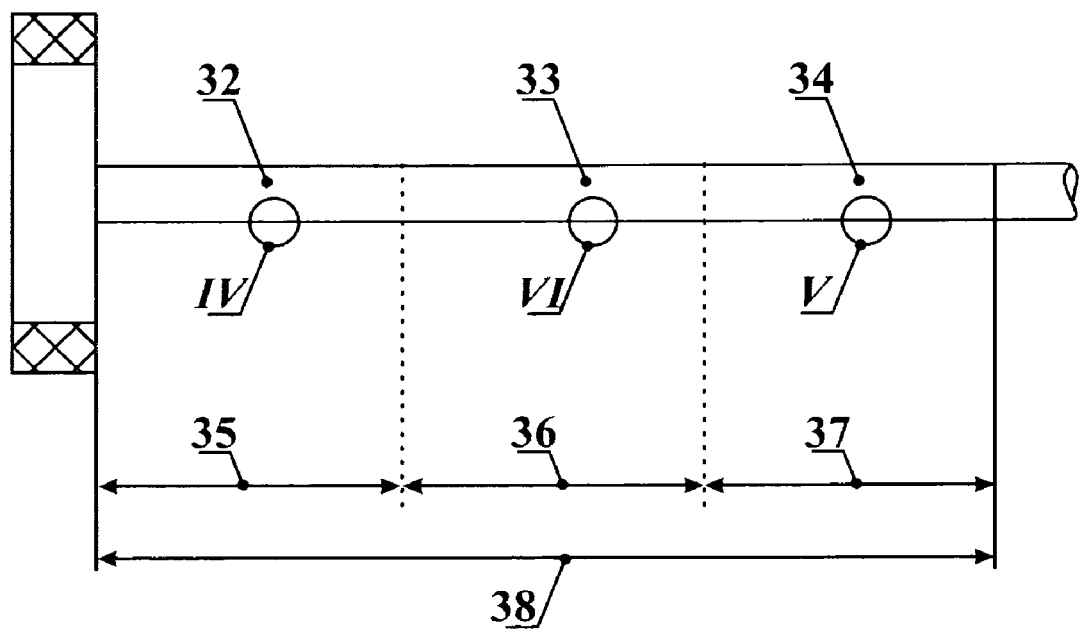
FIG. 2 shows a detail view of three regions (left, middle, and right) with corresponding cross-sections IV, VI and V of the outer surface of rod; three dashed lines conditionally represent boundaries between the three regions, according to an embodiment of the present invention.

FIG. 2 illustrates the rod, having a length 38, and divided into three regions: a left region 32 with a length 35, a middle region 33 with a length 36, and a right region 34 with a length 37. The three regions have corresponding cross-sections IV, VI, and V chosen thereon, and the cross-sections are shown in detail on FIGS. 3, 4, and 5.

Figure 3:
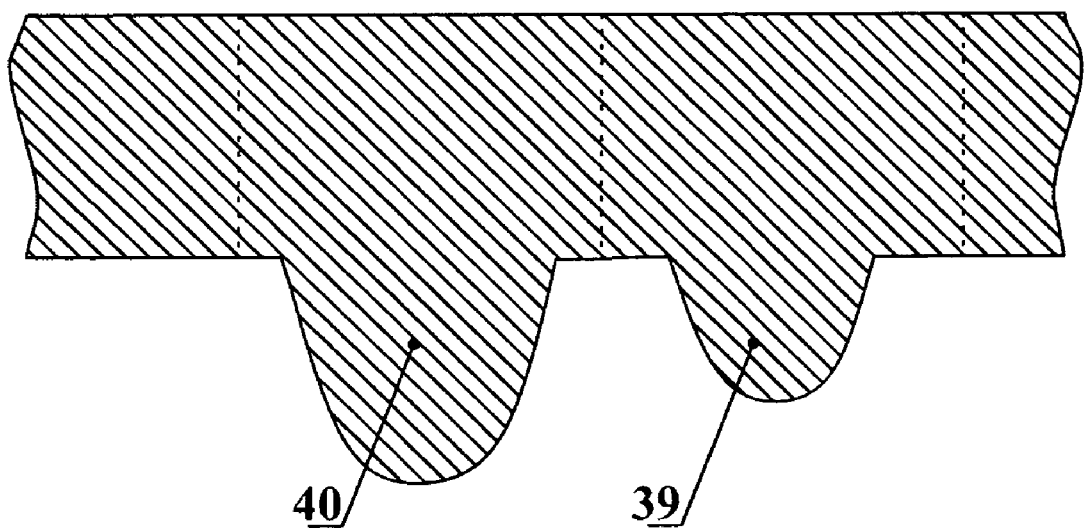
FIG. 3 shows a detail view of the cross-section IV of the left region, proximate to the piston cap; three dashed lines are shown in FIG. 3, which dashed lines represent boundaries between two rod surface sections of the left region, according to the embodiment shown on FIG. 2.

FIG. 3 shows a detail view of the cross-section IV of the left region, proximal to the piston cap; three dashed lines are shown in FIG. 3, which dashed lines represent boundaries between two rod surface sections of the left region, according to the embodiment shown on FIG. 2. The cross-sections of two annular humps 40 and 39 are also depicted on FIG. 3. The outer diameter of hump 40 is greater than the outer diameter of hump 39. The difference between the first maximal diameter and the second maximal diameter preferably ranges from 3 to 10 micrometers.

Figure 4:
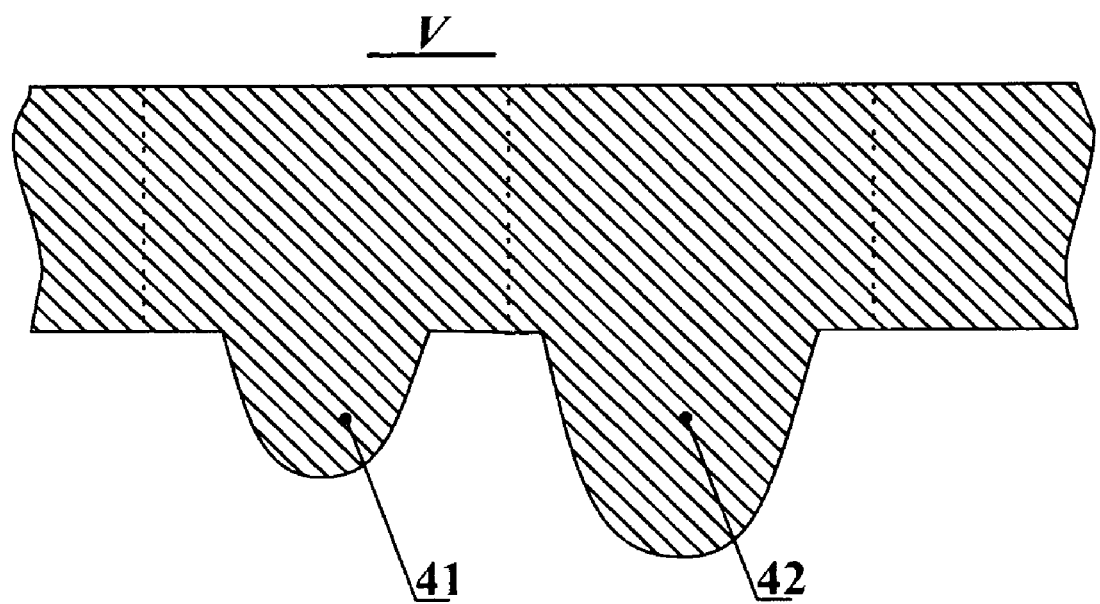
FIG. 4 shows a detail view of the cross-section V of the right region, distal from the piston cap; three dashed lines are shown in FIG. 4, which dashed lines represent boundaries between two rod surface sections in the right region, according to the embodiment shown on FIG. 2.

FIG. 4 shows a detail view of the cross-section V of the right region, distal from the piston cap; three dashed lines are shown in FIG. 4, which dashed lines represent boundaries between two rod surface sections in the right region, according to the embodiment shown on FIG. 2. The cross-sections of two annular humps 41 and 42 are also depicted on FIG. 4. The outer diameter of hump 42 is greater than the outer diameter of hump 41. The difference between the first maximal diameter and the second maximal diameter preferably ranges from 3 to 10 micrometers.

Figure 5:
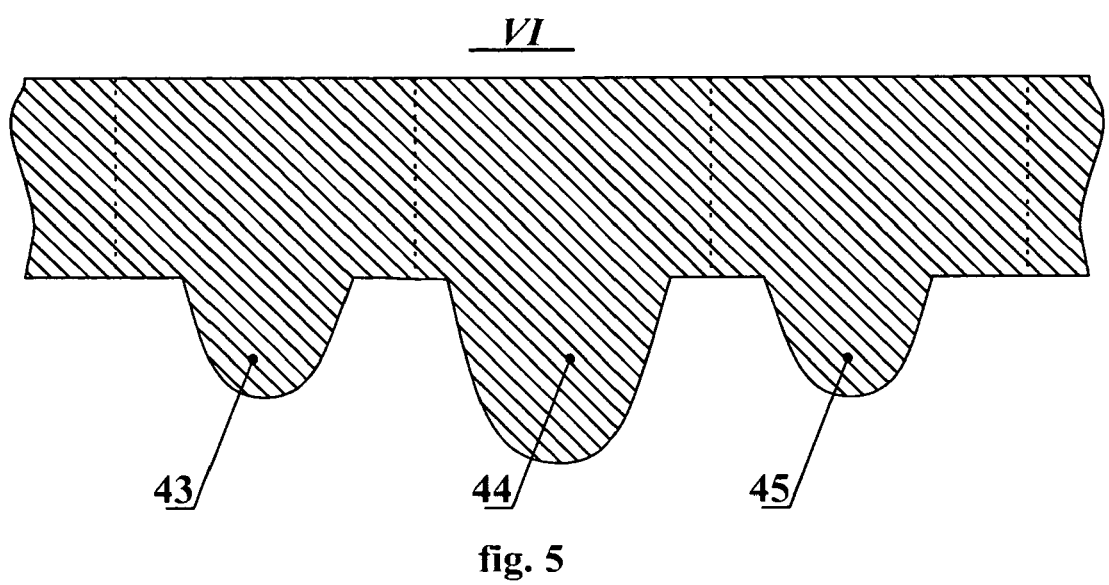
FIG. 5 shows a detail view of the cross-section VI of the middle region; four dashed lines are shown in FIG. 5, which dashed lines represent boundaries between three rod surface sections in the middle region, according to the embodiment shown on FIG. 2.

FIG. 5 shows a detail view of the cross-section VI of the middle region; four dashed lines are shown in FIG. 5, which dashed lines represent boundaries between three rod surface sections in the middle region, according to the embodiment shown on FIG. 2. The cross-sections of three annular humps 43, 44 and 45 are also depicted on FIG. 5. The outer diameter of hump 44 is greater than the outer diameter of hump 43. The outer diameter of hump 44 is greater than the outer diameter of hump 45.

Figure 24:
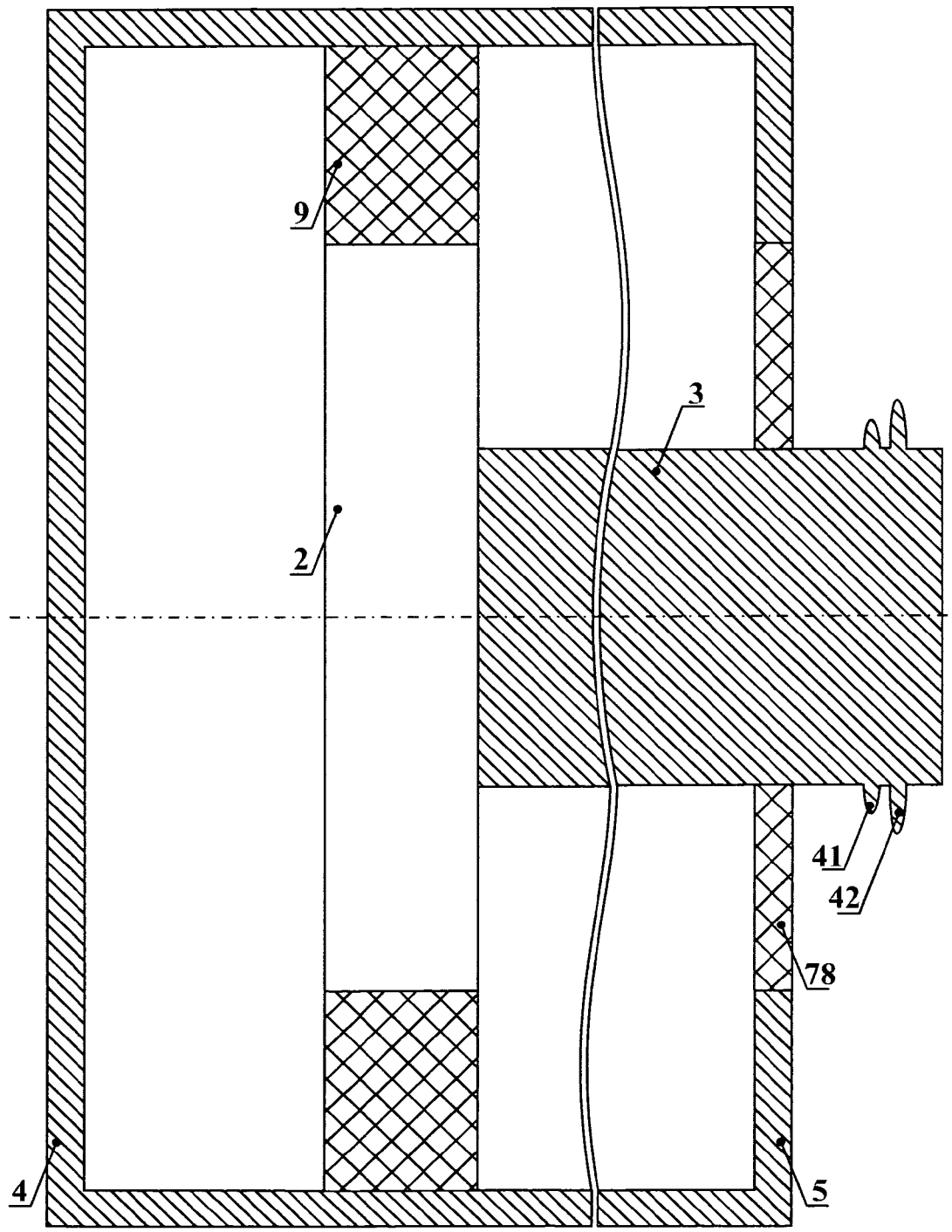
FIG. 24 shows a longitudinal cross-sectional view of the shock absorber including: a sleeve, a piston, and a rod with two annular humps of different diameters disposed at the end of the rod distal in relation to the piston, according to an embodiment of the present invention.

FIG. 24 shows a fragment of longitudinal cross-sectional view of the shock absorber including: the piston cap 4, the piston 2 furnished with the piston seal 9, the rod cap furnished with the rod seal 78, and the rod 3 with two annular humps 41 and 42 of different diameters disposed at the end of the rod distal in relation to the piston, according to an embodiment of the present invention.

Figure 25:
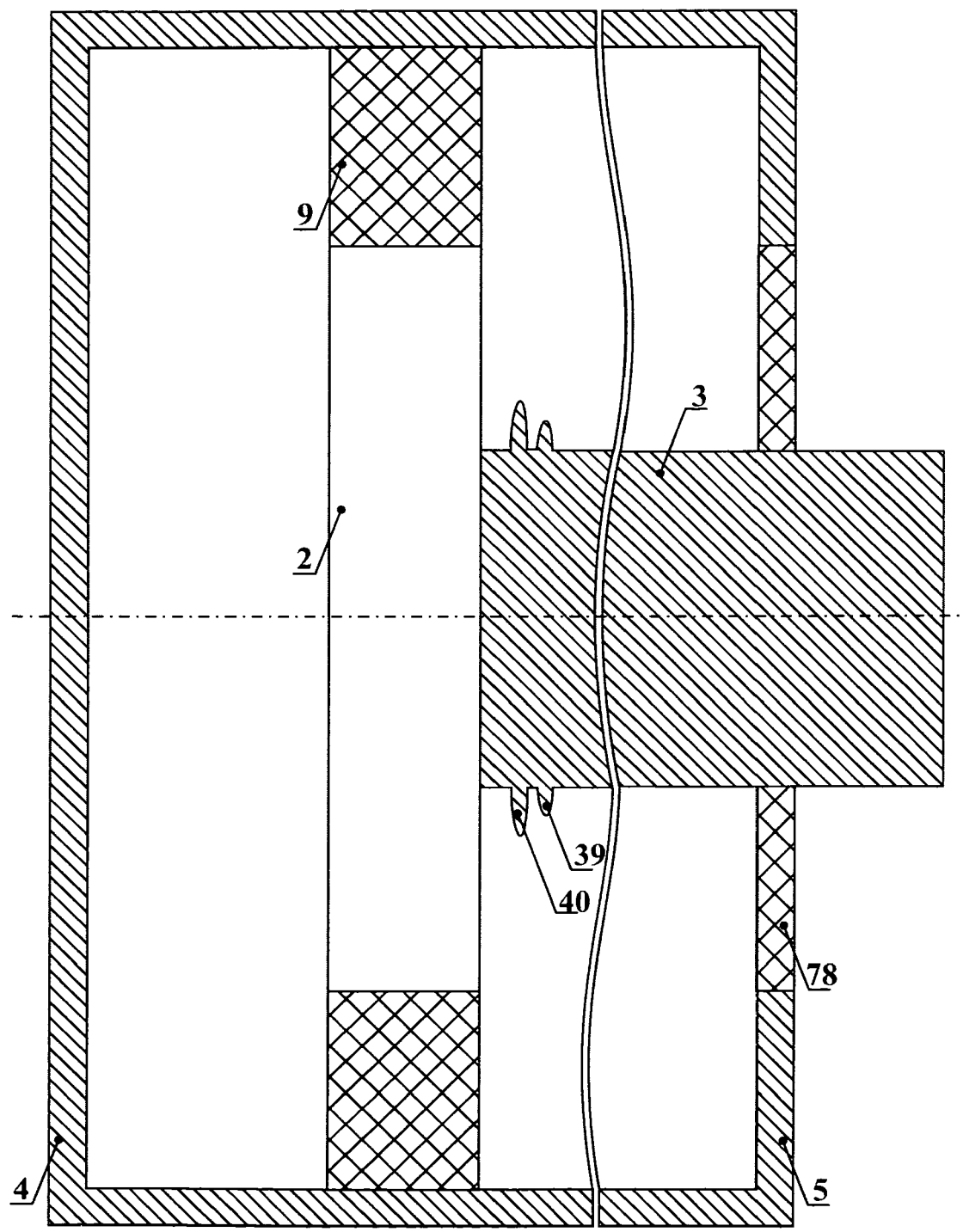
FIG. 25 shows a longitudinal cross-sectional view of the shock absorber including: a sleeve, a piston, and a rod with two annular humps of different diameters disposed at the end of the rod proximal in relation to the piston, according to an embodiment of the present invention.

FIG. 25 shows a fragment of longitudinal cross-sectional view of the shock absorber including: the piston cap 4, the piston 2 furnished with the piston seal 9, the rod cap furnished with the rod seal 78, and the rod 3 with two annular humps 39 and 40 of different diameters disposed at the end of the rod proximal in relation to the piston, according to an embodiment of the present invention.

Figure 26:
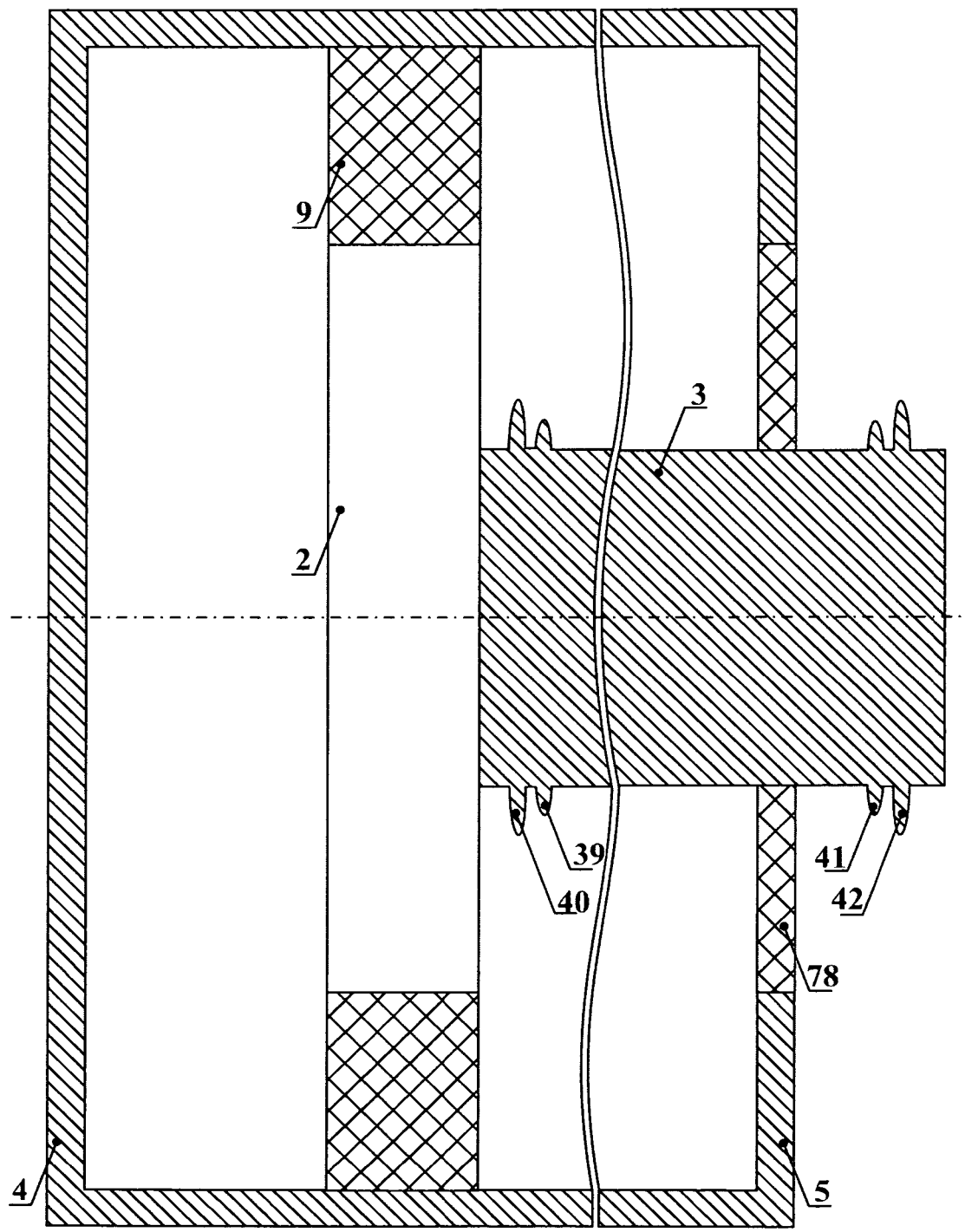
FIG. 26 shows a longitudinal cross-sectional view of the shock absorber including: a sleeve, a piston, and a rod with two annular humps of different diameters disposed at the end of the rod distal in relation to the piston, and with two annular humps of different diameters disposed at the end of the rod proximal in relation to the piston, according to an embodiment of the present invention.

FIG. 26 shows a fragment of longitudinal cross-sectional view of the shock absorber including: the piston cap 4, the piston 2 furnished with the piston seal 9, the rod cap furnished with the rod seal 78, and the rod 3 with two annular humps 39 and 40 of different diameters disposed at the end of the rod proximal in relation to the piston, and two annular humps 41 and 42 of different diameters disposed at the end of the rod distal in relation to the piston, according to an embodiment of the present invention.

Figure 6:
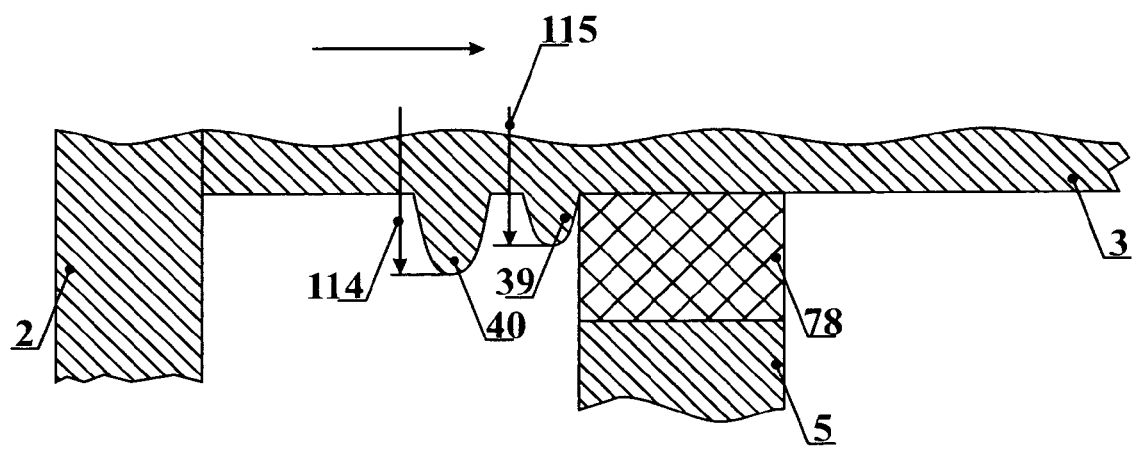
FIG. 6 shows a longitudinal cross-sectional view of the rod with annular humps moving through the rod seal in the right direction (shown by the arrow), according to an embodiment of the present invention; Phase I.

FIG. 6 shows a fragmental longitudinal cross-sectional view of the piston 2 and the rod 3 with an annular hump 40 (its diameter is denoted as 114) and an annular hump 39 (its diameter is denoted as 115 being less than 114) moving through the rod seal 78 in the forward (right) direction (shown by the arrow), according to an embodiment of the present invention. This position is named Phase I. The hump 39 approaches the rod seal 78.

Figure 7:
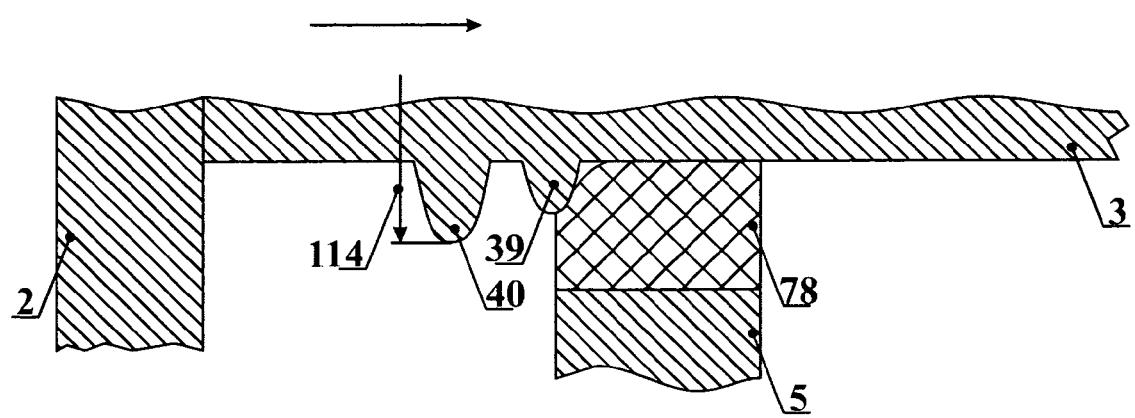
FIG. 7 shows a longitudinal cross-sectional view of the rod with annular humps moving through the rod seal in the right direction, according to the embodiment of the present invention shown on FIG. 6; Phase II.

FIG. 7 shows a fragmental longitudinal cross-sectional view of the rod 3 with the annular hump 40 and the annular hump 39. This position is named Phase II (forward movement). The hump 39 starts interacting with the rod seal 78.

Figure 8:
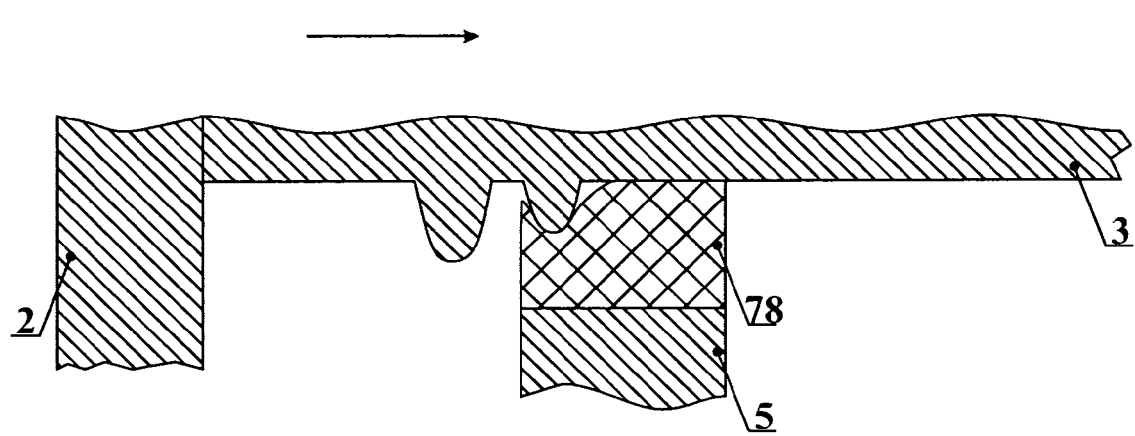
FIG. 8 shows a longitudinal cross-sectional view of the rod with annular humps moving through the rod seal in the right direction, according to the embodiment of the present invention shown on FIG. 6; Phase III.

FIG. 8 shows a fragmental longitudinal cross-sectional view of the rod 3 with the annular hump 40 and the annular hump 39. This position is named Phase III (forward movement). The hump 39 continues interacting with the rod seal 78, while the hump 40 approaches the rod seal 78.

Figure 9:
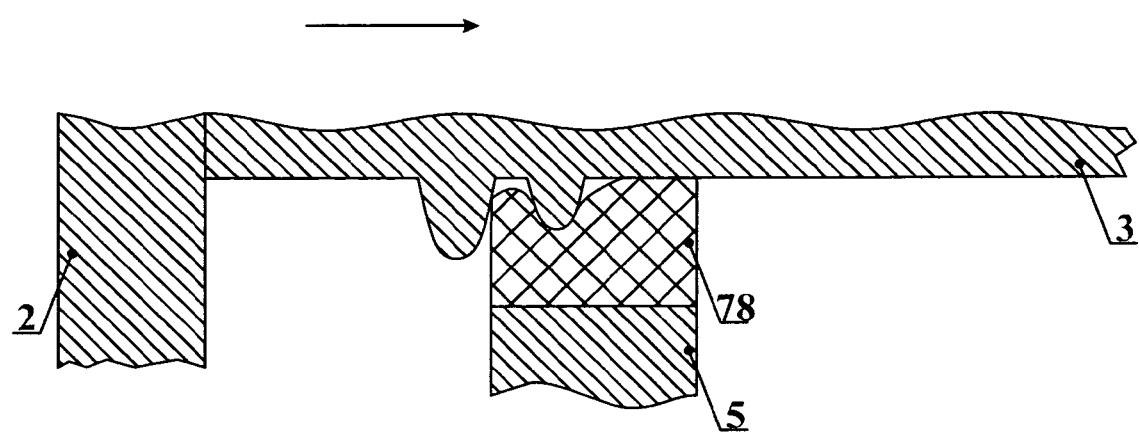
FIG. 9 shows a longitudinal cross-sectional view of the rod with annular humps moving through the rod seal in the right direction, according to the embodiment of the present invention shown on FIG. 6; Phase IV.

FIG. 9 shows a fragmental longitudinal cross-sectional view of the rod 3 with the annular hump 40 and the annular hump 39. This position is named Phase IV (forward movement). The hump 39 continues interacting with the rod seal 78, while the hump 40 encounters the rod seal 78.

Figure 10:
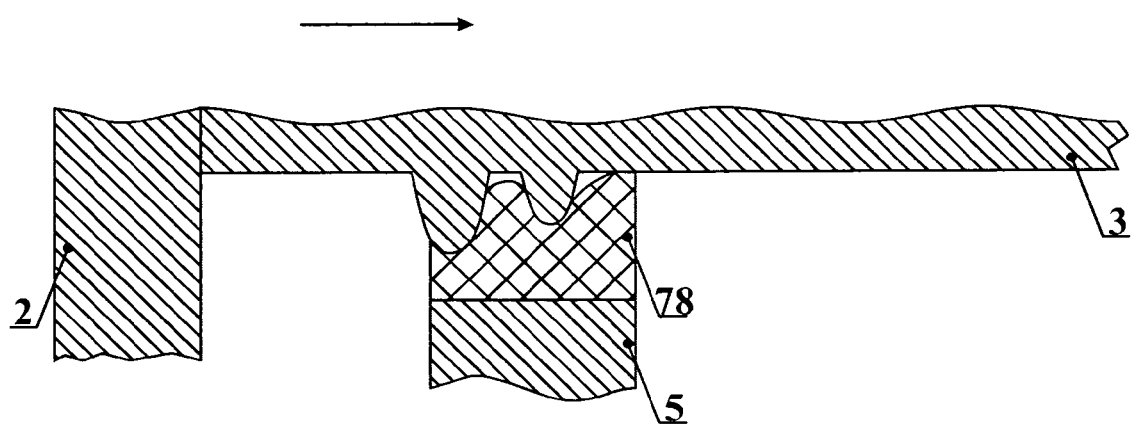
FIG. 10 shows a longitudinal cross-sectional view of the rod with annular humps moving through the rod seal in the right direction, according to the embodiment of the present invention shown on FIG. 6; Phase V.

FIG. 10 shows a fragmental longitudinal cross-sectional view of the rod 3 with the annular hump 40 and the annular hump 39. This position is named Phase V (forward movement). The hump 39 continues interacting with the rod seal 78, while the hump 40 starts interacting with the rod seal 78.

Figure 11:
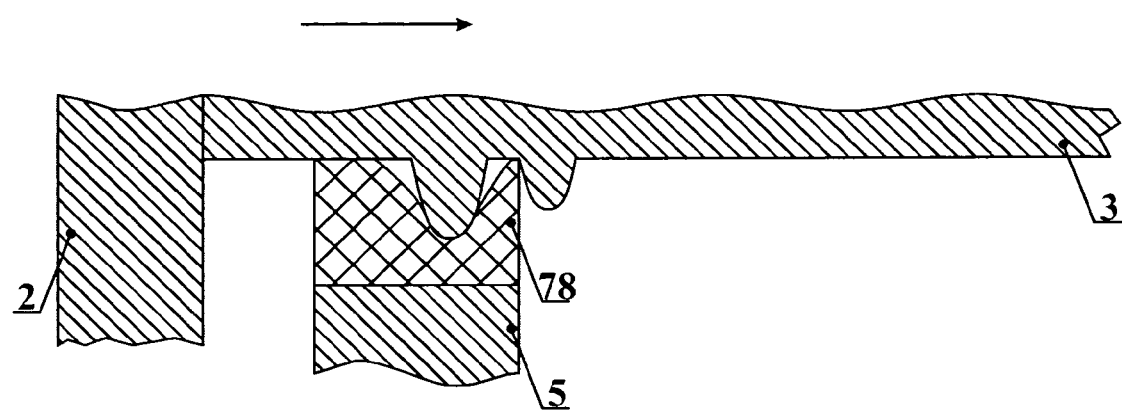
FIG. 11 shows a longitudinal cross-sectional view of the rod with annular humps moving through the rod seal in the right direction, according to the embodiment of the present invention shown on FIG. 6; Phase VI.

FIG. 11 shows a fragmental longitudinal cross-sectional view of the rod 3 with the annular hump 40 and the annular hump 39. This position is named Phase VI (forward movement). The hump 39 leaves the zone of interacting with the rod seal 78, while the hump 40 continues interacting with the rod seal 78.

Figure 12:
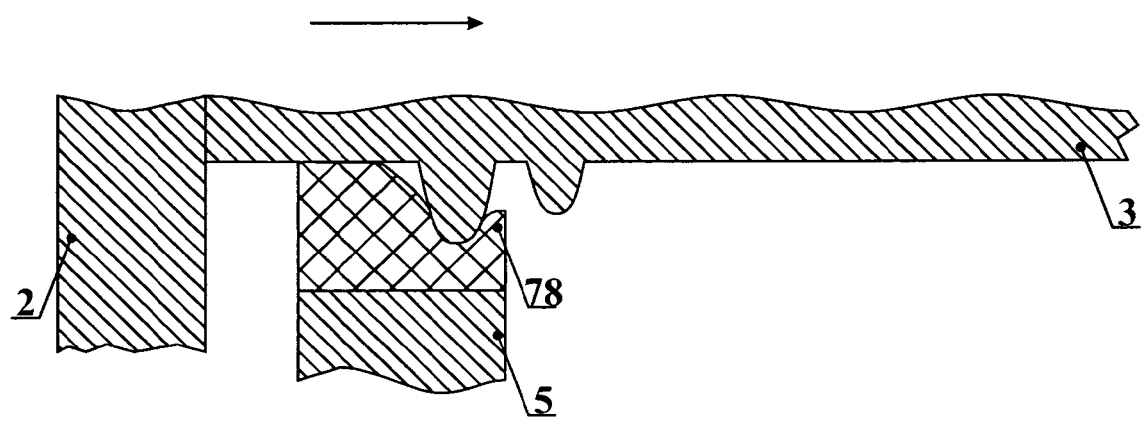
FIG. 12 shows a longitudinal cross-sectional view of the rod with annular humps moving through the rod seal in the right direction, according to the embodiment of the present invention shown on FIG. 6; Phase VII.

FIG. 12 shows a fragmental longitudinal cross-sectional view of the rod 3 with the annular hump 40 and the annular hump 39. This position is named Phase VII (forward movement). The hump 39 is out of the zone of interacting with the rod seal 78, while the hump 40 continues interacting with the rod seal 78.

Figure 13:
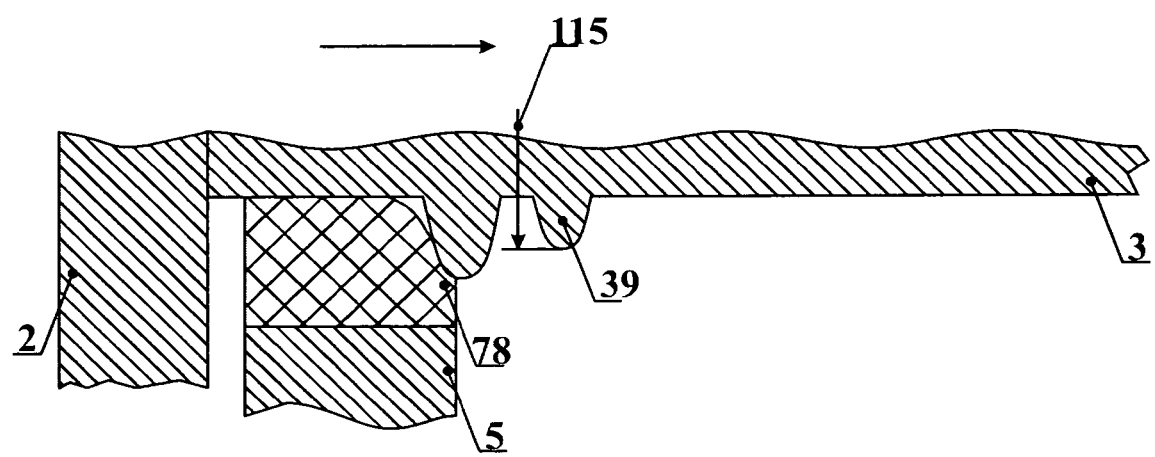
FIG. 13 shows a longitudinal cross-sectional view of the rod with annular humps moving through the rod seal in the right direction, according to the embodiment of the present invention shown on FIG. 6; Phase VIII.

FIG. 13 shows a fragmental longitudinal cross-sectional view of the rod 3 with the annular hump 40 and the annular hump 39. This position is named Phase VIII (forward movement). The hump 39 is out of the zone of interacting with the rod seal 78, while the hump 40 finishes interacting with the rod seal 78.

Figure 14:
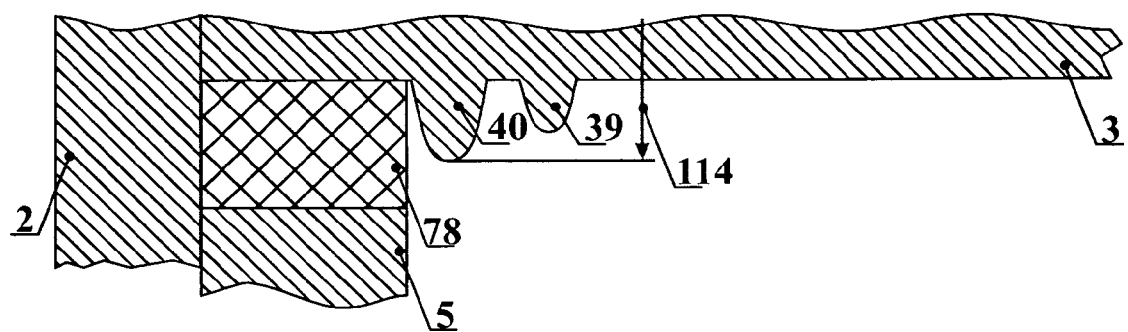
FIG. 14 shows a longitudinal cross-sectional view of the rod with annular humps that has reached the maximal right hand position, according to the embodiment of the present invention shown on FIG. 6; Phase IX.

FIG. 14 a fragmental longitudinal cross-sectional view of the rod 3 with the annular hump 40 and the annular hump 39. This position is named Phase IX (the end right position of the rod). The humps 39 and 40 are out of the zone of interacting with the rod seal 78. The piston 2 meets the rod cap 5, which prevents it from further movement.

Figure 15:
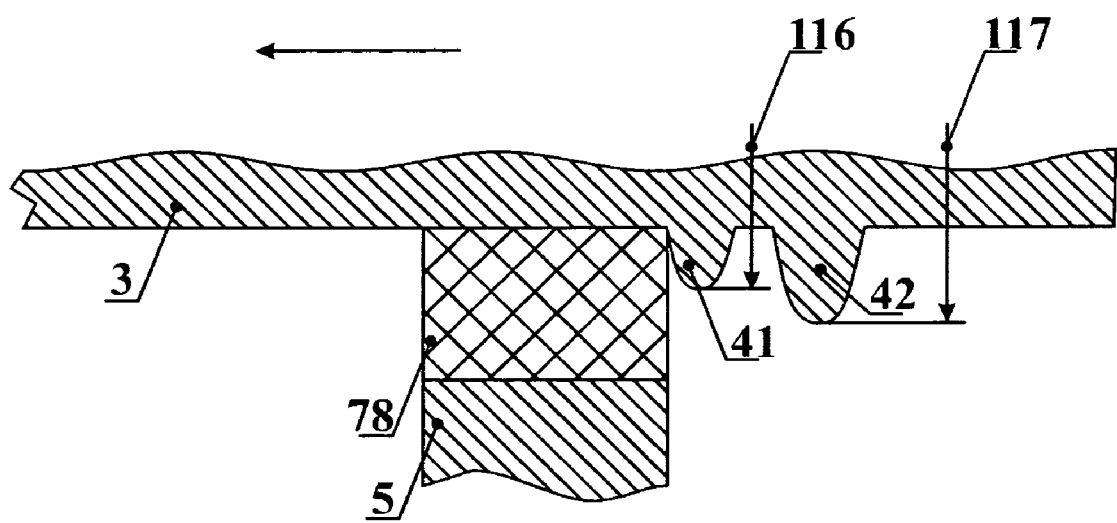
FIG. 15 shows a longitudinal cross-sectional view of the rod with annular humps moving through the rod seal in the left (shown by the arrow) direction, according to the embodiment of the present invention shown on FIG. 6; Phase X.

FIG. 15 shows a fragmental longitudinal cross-sectional view of the piston 2 and the rod 3 with an annular hump 41 (its diameter is denoted as 116) and an annular hump 42 (its diameter is denoted as 117 being greater than 116) moving through the rod seal 78 in the reverse (left) direction (shown by the arrow), according to an embodiment of the present invention. This position is named Phase X. The hump 41 approaches the rod seal 78.

Figure 16:
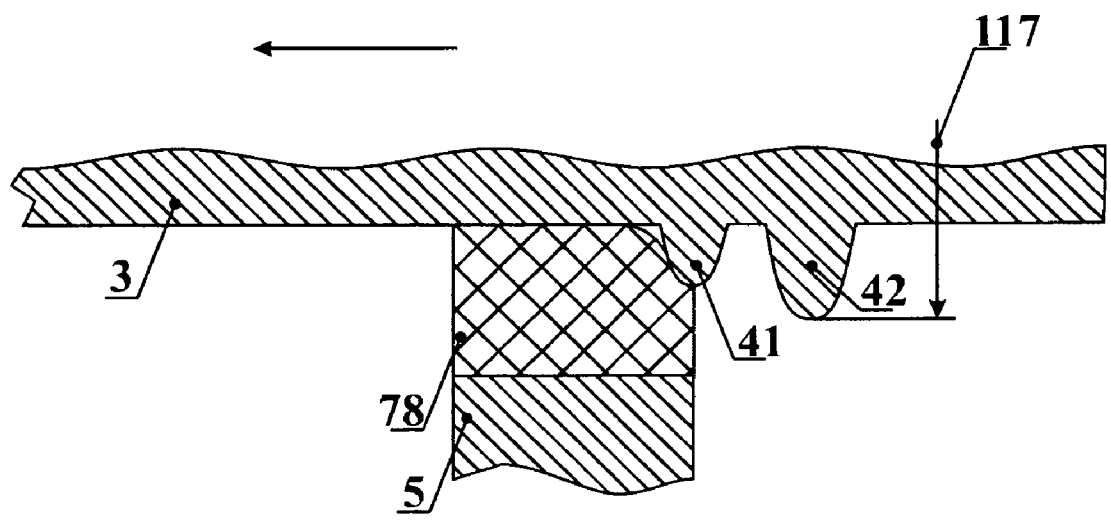
FIG. 16 shows a longitudinal cross-sectional view of the rod with annular humps moving through the rod seal in the left direction, according to the embodiment of the present invention shown on FIG. 6; Phase XI.

FIG. 16 shows a fragmental longitudinal cross-sectional view of the rod 3 with the annular hump 41 and the annular hump 42. This position is named Phase XI (reverse movement). The hump 41 starts interacting with the rod seal 78.

Figure 17:
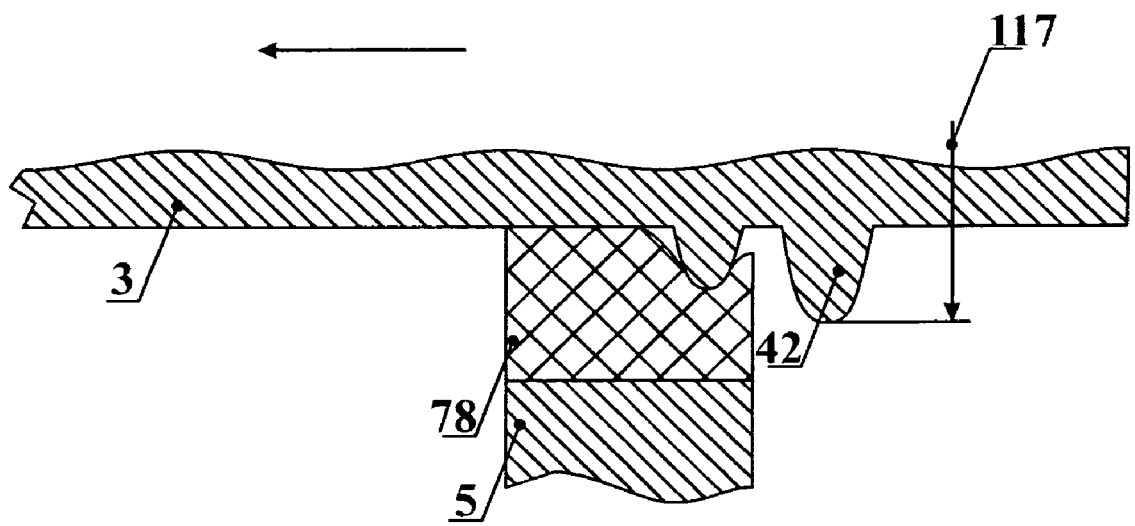
FIG. 17 shows a longitudinal cross-sectional view of the rod with annular humps moving through the rod seal in the left direction, according to the embodiment of the present invention shown on FIG. 6; Phase XII.

FIG. 17 shows a fragmental longitudinal cross-sectional view of the rod 3 with the annular hump 41 and the annular hump 42. This position is named Phase XII (reverse movement). The hump 41 continues interacting with the rod seal 78, while the hump 42 approaches the rod seal 78.

Figure 18:
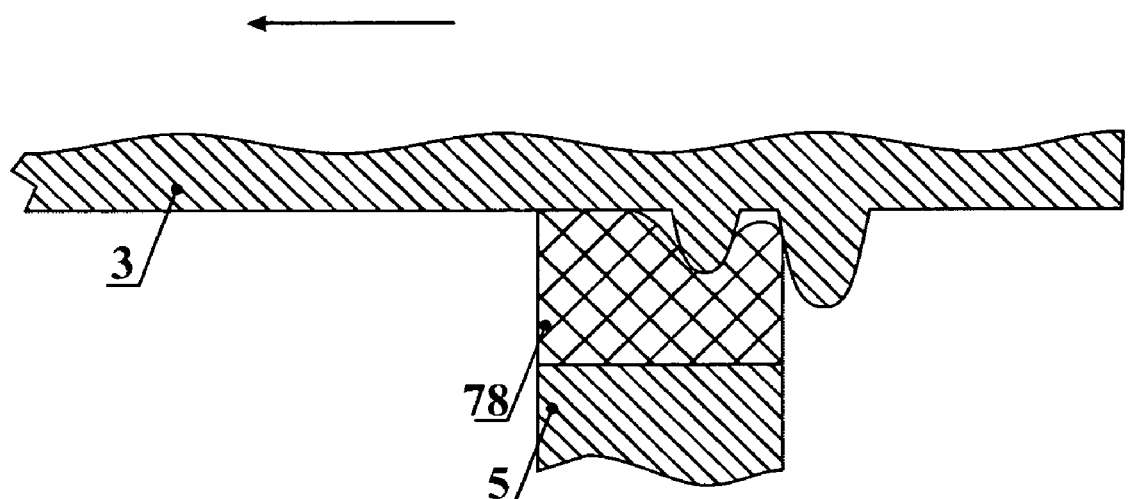
FIG. 18 shows a longitudinal cross-sectional view of the rod with annular humps moving through the rod seal in the left direction, according to the embodiment of the present invention shown on FIG. 6; Phase XIII.

FIG. 18 shows a fragmental longitudinal cross-sectional view of the rod 3 with the annular hump 41 and the annular hump 42. This position is named Phase XIII (reverse movement). The hump 41 continues interacting with the rod seal 78, while the hump 42 encounters the rod seal 78.

Figure 19:
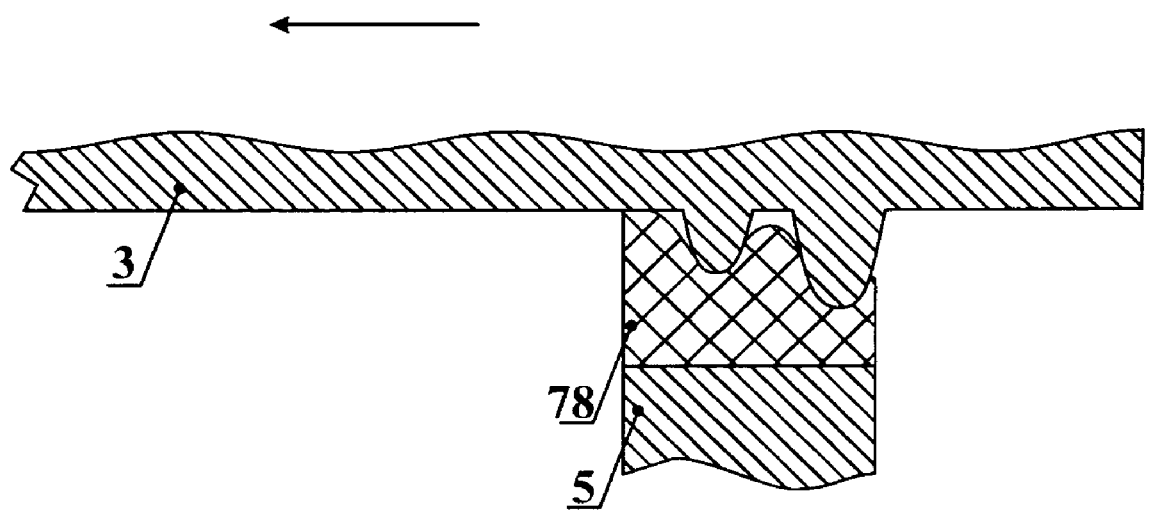
FIG. 19 shows a longitudinal cross-sectional view of the rod with annular humps moving through the rod seal in the left direction, according to the embodiment of the present invention shown on FIG. 6; Phase XIV.

FIG. 19 shows a fragmental longitudinal cross-sectional view of the rod 3 with the annular hump 41 and the annular hump 42. This position is named Phase XIV (reverse movement). The hump 41 continues interacting with the rod seal 78, while the hump 42 starts interacting with the rod seal 78.

Figure 20:
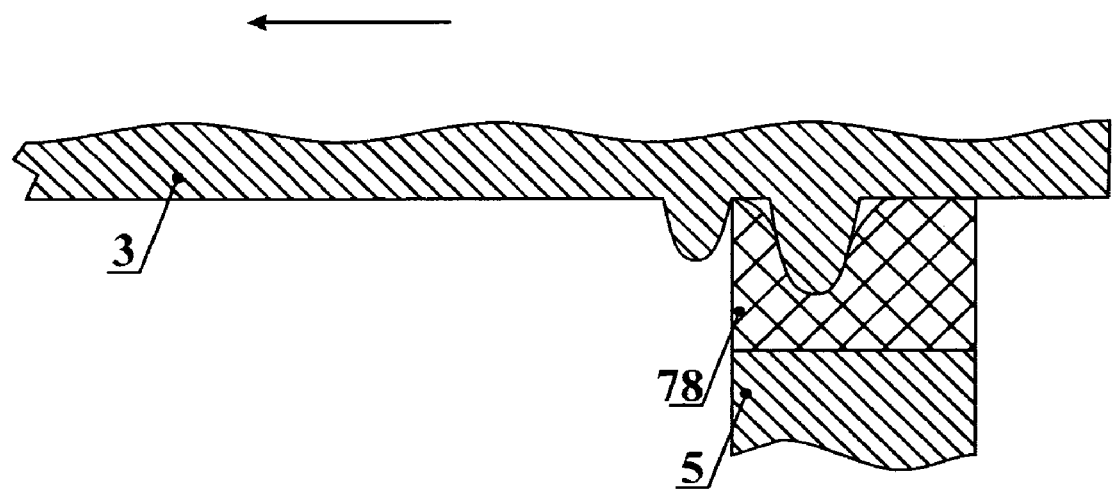
FIG. 20 shows a longitudinal cross-sectional view of the rod with annular humps moving through the rod seal in the left direction, according to the embodiment of the present invention shown on FIG. 6; Phase XV.

FIG. 20 shows a fragmental longitudinal cross-sectional view of the rod 3 with the annular hump 41 and the annular hump 42. This position is named Phase XV (reverse movement). The hump 41 leaves the zone of interacting with the rod seal 78, while the hump 42 continues interacting with the rod seal 78.

Figure 21:
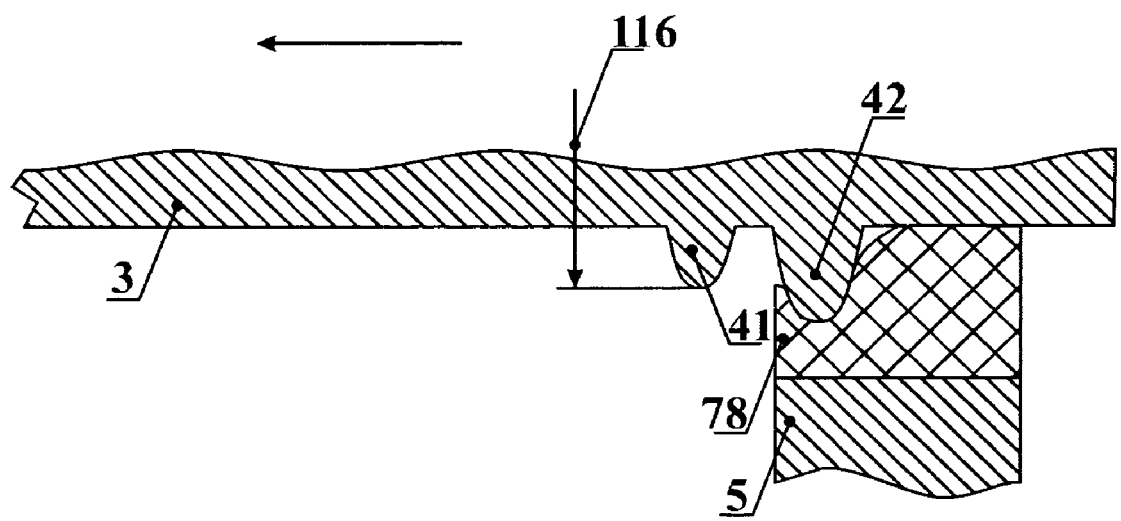
FIG. 21 shows a longitudinal cross-sectional view of the rod with annular humps moving through the rod seal in the left direction, according to the embodiment of the present invention shown on FIG. 6; Phase XVI.

FIG. 21 shows a fragmental longitudinal cross-sectional view of the rod 3 with the annular hump 41 and the annular hump 42. This position is named Phase XVI (reverse movement). The hump 41 is out of the zone of interacting with the rod seal 78, while the hump 42 continues interacting with the rod seal 78.

Figure 22:
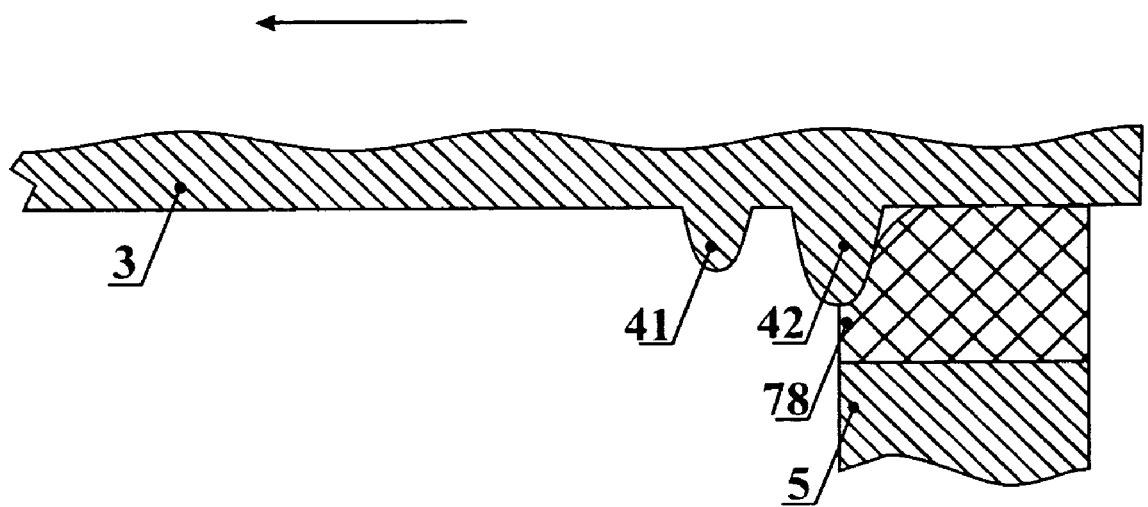
FIG. 22 shows a longitudinal cross-sectional view of the rod with annular humps moving through the rod seal in the left direction, according to the embodiment of the present invention shown on FIG. 6; Phase XVII.

FIG. 22 shows a fragmental longitudinal cross-sectional view of the rod 3 with the annular hump 41 and the annular hump 42. This position is named Phase XVII (reverse movement). The hump 41 is out of the zone of interacting with the rod seal 78, while the hump 42 finishes interacting with the rod seal 78.

Figure 23:
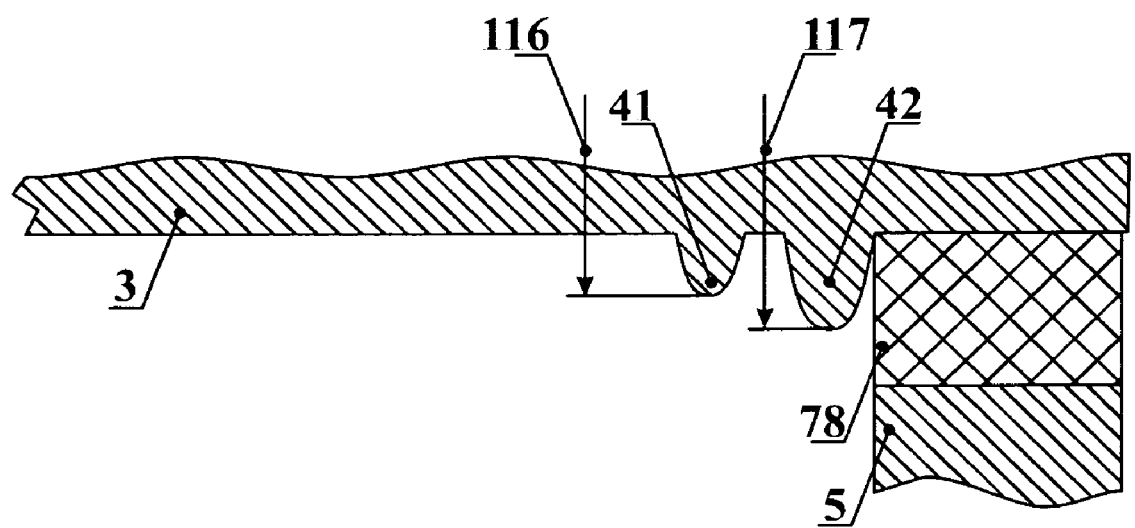
FIG. 23 shows a longitudinal cross-sectional view of the rod with annular humps that has reached the maximal left hand position, according to the embodiment of the present invention shown on FIG. 6; Phase XVIII.

FIG. 23 shows a fragmental longitudinal cross-sectional view of the rod 3 with the annular hump 41 and the annular hump 42. This position is named Phase XVIII (the end left position of the rod). The humps 41 and 42 are out of the zone of interacting with the rod seal 78. The piston 2 meets the piston cap 5, which prevents it from further movement.

The aforementioned embodiments provide the following results:

significant increasing the force counteracting the movements of rod in the rod's region adjoined to the rod cap;

deploying the rod's seal front face during the forward (from the left to the right) travel and the rod's rear face during the reverse (from the right to the left) travel of the rod;

cushioning the impact and reducing the overload during the forward travel of the rod towards the rod cap caused by interaction of the rod's annular humps with the front face of the rod seal producing deformations of the rod seal; and cushioning the impact and reducing the overload during the reverse travel of the rod towards the piston cap caused by interaction of the rod's annular humps with the rear face of the rod seal producing deformations of the rod seal.

We claim:

1. A shock absorber for a transportation means comprising:
a sleeve with an operation area; a piston cap, a rod, a rod cap with a rod seal for sealing the rod, a piston with a piston seal; the operation area of the sleeve includes a sleeve area jointed to the piston cap and a sleeve area jointed to the rod cap; the rod includes a rod area jointed to an end free of the piston and a piston area of the rod, wherein the piston is made with a capability of longitudinal movement along the operation area of the sleeve, and the rod with the piston are made with a capability of join longitudinal movement in the sleeve; said shock absorber is different in that:
the rod is made such that in the area jointed to the end being free of the piston, the rod surface along a length of the rod includes at least two regions, and on each of the regions along a direction from the piston to the end being free of the piston, an inner diameter of the rod along the length of the rod's region increases to a value of a maximal outer diameter on this region, and then decreases to a value of a minimal outer diameter on this region;

and, on the region most proximate to the end being free from the piston, the maximal outer diameter of the rod is greater than the maximal outer diameter of the region most remote from the end being free of the piston;

and, in the piston area of the rod, the rod surface, along the length of the area, includes at least two regions, each of the regions in a direction from the piston to the rod's end being free of the piston, an inner diameter of the rod, along the length of the region, increases to a value of a maximal outer diameter of the rod, and then decreases to a value of a minimal outer diameter of the rod on this region;

and, on the region, most proximate to the piston, the maximal outer diameter of the rod is greater than the maximal outer diameter of the rod on the region most remote from the piston.

2. A shock absorber for a transportation means comprising:
a sleeve;
a piston operatively accomplishing reciprocal movements consisting of forward and reverse travels within said sleeve;
a rod having a first end rigidly coupled with the piston and a second end extending beyond said sleeve, said rod has a longitudinal axis;
a piston cap closing said sleeve from the piston's side;
a rod cap closing said sleeve from the rod's side;
wherein:
said rod cap includes an orifice situated substantially in the center of said rod cap and a rod seal mounted in said orifice;
said rod seal defines a front face facing the piston and a rear face being opposite to the front face;
said rod is capable of slidely and sealingly moving through said rod seal along the longitudinal axis;
said rod includes at least two rod regions including annular humps; and
said front and rear faces operatively sequentially interact with said annular humps during the forward and reverse travels, such that the interaction causes deformations of said rod seal thereby cushioning impacts and reducing overloads of the shock absorber.

3. The shock absorber according to claim 2, wherein said annular humps are represented by:
a first annular hump having a first maximal diameter, and
a second annular hump having a second maximal diameter;
wherein
said first maximal diameter is greater than said second maximal diameter.

4. The shock absorber according to claim 3, wherein the difference between said first maximal diameter and said second maximal diameter ranges from 3 to 10 micrometers.

* * * * *